US011913721B2

(12) United States Patent
Sloth Jensen

(10) Patent No.: US 11,913,721 B2
(45) Date of Patent: Feb. 27, 2024

(54) APPARATUS, A BOTTOM PLATE COMPONENT AND A METHOD FOR DRYING BULK PARTICULATE MATERIAL

(71) Applicant: ED-IPR APS, Virum (DK)

(72) Inventor: Arne Sloth Jensen, Kgs. Lyngby (DK)

(73) Assignee: ED-IPR APS, Virum (DK)

( * ) Notice: Subject to any disclaimer, the term of this patent is extended or adjusted under 35 U.S.C. 154(b) by 211 days.

(21) Appl. No.: 17/299,505

(22) PCT Filed: Nov. 11, 2019

(86) PCT No.: PCT/EP2019/080846
§ 371 (c)(1),
(2) Date: Jun. 3, 2021

(87) PCT Pub. No.: WO2020/114723
PCT Pub. Date: Jun. 11, 2020

(65) Prior Publication Data
US 2022/0026146 A1 Jan. 27, 2022

(30) Foreign Application Priority Data
Dec. 5, 2018 (EP) .................................... 18210493

(51) Int. Cl.
*F26B 17/10* (2006.01)
*F26B 21/00* (2006.01)
*F26B 25/00* (2006.01)

(52) U.S. Cl.
CPC .......... *F26B 17/105* (2013.01); *F26B 17/107* (2013.01); *F26B 21/005* (2013.01); *F26B 25/002* (2013.01)

(58) Field of Classification Search
CPC .... F26B 17/107; F26B 21/005; F26B 25/002; F26B 17/10
(Continued)

(56) References Cited

U.S. PATENT DOCUMENTS 5,289,643 A 3/1994 Jensen
6,148,540 A * 11/2000 Ohmura ................ F26B 17/107 34/360
(Continued)

FOREIGN PATENT DOCUMENTS

EP 0058651 A1 8/1982
EP 0153704 A2 9/1985
(Continued)

OTHER PUBLICATIONS

PCT International Search Report and Written Opinion in PCT/EP2019/080846 dated Dec. 3, 2019, 10 pages.

*Primary Examiner* — John P McCormack
(74) *Attorney, Agent, or Firm* — Servilla Whitney LLC

(57) ABSTRACT

An apparatus for drying bulk particulate material, and having an inlet chamber for receiving a moist bulk particulate material and an outlet chamber for ejecting a dry bulk particulate material. The inlet chamber comprises a steam permeable bottom being divided into a number of subsections including a first subsection and a second subsection. Each subsection defines a first and a second radial centreline. The first subsection and the second subsection each having at least one louvered plate section comprising a plurality of louvers arranged in a first and a second specific direction, respectively, for directing superheated steam in a first and second blowing direction, towards said lower cylindrical inner wall. The specific direction of the louvers of the first subsection defines a first angle in relation to the first radial centre-line, and specific direction of said louvers of said second subsection defines a second angle in relation to said second radial centreline, and said first angle and/or said second angle, being different from 0 degrees.

7 Claims, 7 Drawing Sheets

(58) Field of Classification Search
USPC .......................................................... 34/218
See application file for complete search history.

(56) References Cited

U.S. PATENT DOCUMENTS

| | | | | |
|---|---|---|---|---|
| 8,578,624 | B2 * | 11/2013 | Jordison | ............... F26B 17/122 34/167 |
| 2009/0000144 | A1 | 1/2009 | Berg | |

FOREIGN PATENT DOCUMENTS

| | | | | |
|---|---|---|---|---|
| EP | 3009777 | A1 * | 4/2016 | .............. F26B 17/10 |
| WO | 92/01200 | A1 | 1/1992 | |

* cited by examiner

Fig. 5A
Fig. 5B
Fig. 5C
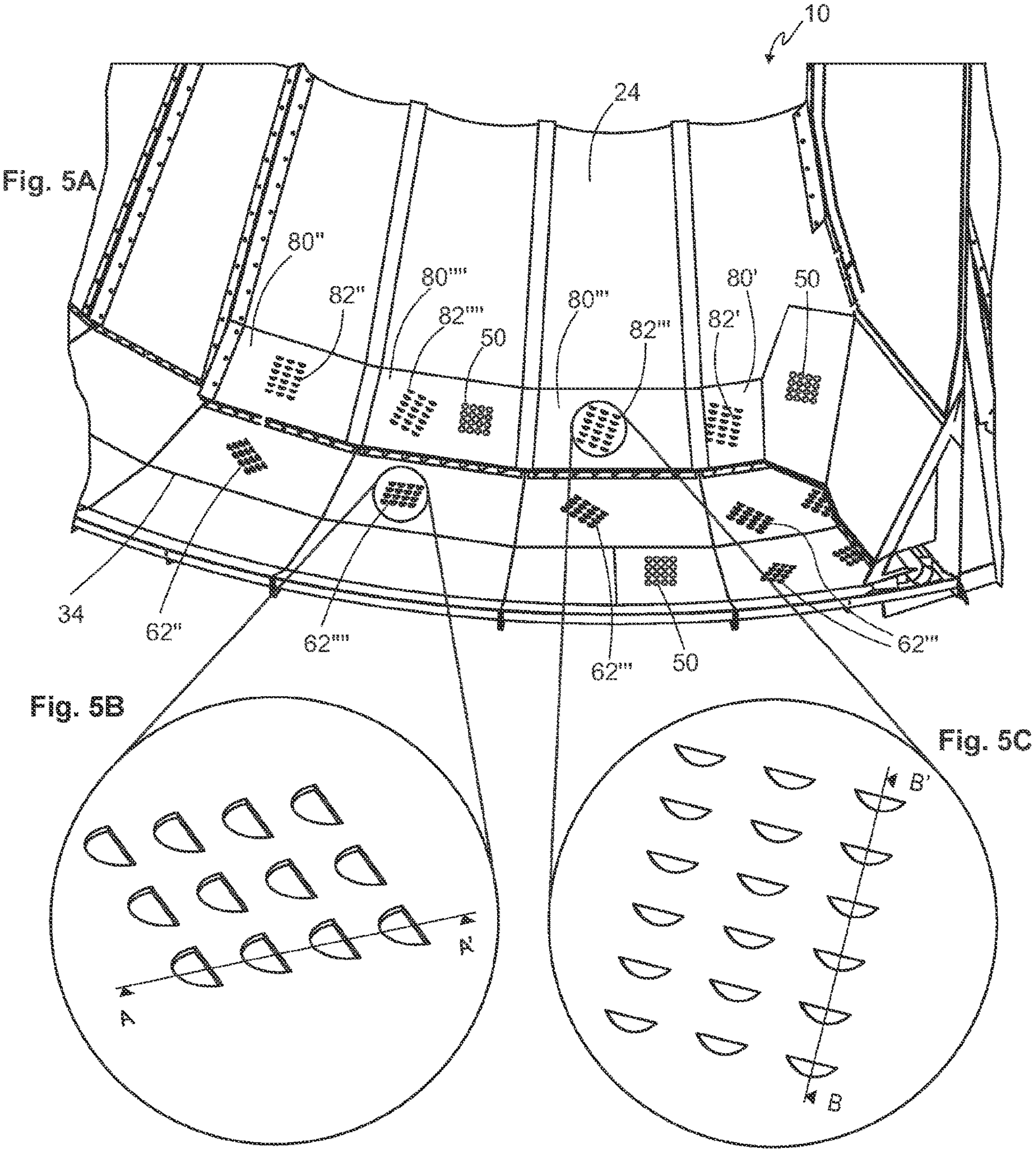
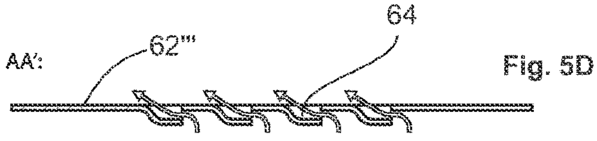
Fig. 5D
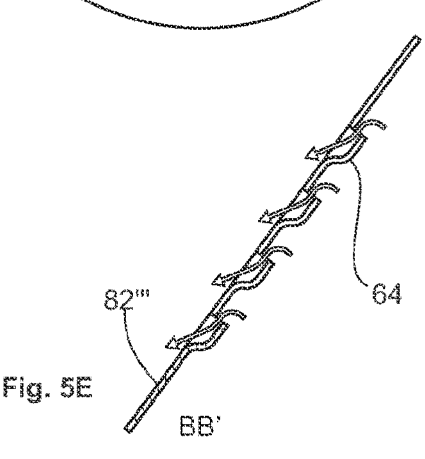
Fig. 5E

APPARATUS, A BOTTOM PLATE COMPONENT AND A METHOD FOR DRYING BULK PARTICULATE MATERIAL

CROSS-REFERENCE TO RELATED APPLICATIONS

This application is the National Stage entry of PCT/EP2019/080846, filed on Nov. 11, 2019, which claims priority to European Application. Serial No. 18210493.5, filed Dec. 5, 2018, the entire disclosures of which are hereby incorporated by reference herein.

BACKGROUND OF THE INVENTION

It is known to dry moist bulk particulate material by contacting the particulate material with superheated steam. Hereby, liquid contained within the material is evaporated.

An early disclosure of the above-mentioned steam drying technologies includes EP 0 058 651 A1 which relates to a method of preparing cattle feed from various agricultural products, such as sugar beet pulp, citrus fruit pulp and peel and various fermentation products.

Another disclosure is EP 0 153 704 A2 which teaches a process of removing liquid from a particulate solid material in which the material is passed through a row of interconnected cells and superheated steam is introduced into said cells at their lower ends so as to impart a whirling movement during dried panicles to be dried are lifted out of the cells and into a common transfer zone and into a discharge cell with no steam supply.

The prior art document WO 92/01200 discloses an apparatus for drying a moist particulate material having a non-uniform particle size with superheated steam. The apparatus comprises a cylindrical vessel comprising a number of parallel, substantially vertical drying chambers located in ring form. The preferred embodiment includes fifteen drying chambers connected in series, and a discharge chamber located between the first and the last drying chamber.

At the first drying chamber after the inlet, the particulate material will have a high liquid content whereas the particulate material at the last drying chamber will have a low liquid content. The drying chambers are adapted to induce a movement of the flow of superheated steam in order to improve the contact between the steam and the particulate material and to cause the particulate material to pass all cells just in time to be dried. In particular, the moist particles tend to be heavier than the dry particles and thus require a larger flow and steam velocity.

It has been noted by the applicant that the moist particulate material, and in particular the large and heavy particles, tend to accumulate in first drying chamber. Particulate material remaining an extended period in the first drying chamber may potentially clog the first drying chamber and reduce the intensity of the whirling movement of the flow of superheated steam.

It is thus an object of according to the present invention to provide improved technologies for avoiding accumulation of material within the first drying chamber by establishing one or more whirling motions in different directions within the first drying chamber.

Especially, it is an object of the invention to establish an improved mixing of the particles already semi-dried within the first drying chamber and new particles such that the whirling movements with increased velocity allows the particulate material to distribute more evenly within the first drying chamber, which will result in a more effective drying.

SUMMARY OF THE INVENTION

The above objects which are evident from the below detailed description are according to a first aspect of the present invention achieved by an apparatus for drying moist bulk particulate materials, the apparatus comprising:

a vessel capable of maintaining superheated steam at a pressure equal to or larger than the ambient pressure surrounding the vessel, the vessel defining a lower cylindrical part having a lower cylindrical inner wall and defining a first cross-sectional area being perpendicular to the length of the lower cylindrical part and an upper cylindrical part having an upper cylindrical inner wall and defining a second cross-sectional area being perpendicular to the length of the upper cylindrical part, an inner cylindrical part centrally located within the upper cylindrical part and the lower cylindrical part of the vessel for establishing a first fluid path from the upper cylindrical part to the lower cylindrical part within the inner cylindrical part and a second fluid path from the lower cylindrical part to the upper cylindrical part outside the inner cylindrical part, a number of partitioning walls extending radially within the lower cylindrical part between the lower cylindrical part and the inner cylindrical part and defining in the lower cylindrical part an inlet chamber, an outlet chamber and a number of intermediate chambers located between the inlet chamber and the outlet chamber in a circumferential direction, the inlet chamber comprising an inlet for receiving a moist bulk particulate material, the outlet chamber comprising an outlet for ejecting a dry bulk particulate material, the inlet chamber and the intermediate chambers each defining a steam permeable bottom, a heat exchanger assembly located within the inner cylindrical part for heating the superheated steam, an impeller for generating a flow of superheated steam within the vessel and along the first fluid path from the upper cylindrical part through the heat exchanger within the inner cylindrical part to the lower cylindrical part and generally along the second fluid path from the lower cylindrical part to the upper cylindrical part outside the inner cylindrical part, the steam permeable bottom of at least the inlet chamber being divided into a number of subsections including a first subsection and a second subsection defining a first and a second radial centreline, respectively, the first subsection and the second subsection each having at least one louvered plate section comprising a plurality of louvers arranged in a first and a second specific direction, respectively, for directing the superheated steam in a first and second blowing direction, respectively, towards the lower cylindrical inner wall, the specific direction of the louvers of the first subsection defining a first angle in relation to the first radial centreline, the specific direction of the louvers of the second subsection defining a second angle in relation to the second radial centreline, and the first angle and/or the second angle, being different from 0 degrees.

The vessel is typically made of metal capable of withstanding temperatures of superheated steam exceeding 100°

C. and pressures exceeding the ambient atmospheric pressure. Typical pressures range from ambient atmospheric pressures to a pressure of up to 3 bar. The vessel comprises a lower cylindrical part and an upper cylindrical part which form part of the outer enclosure of the vessel and an intermediate conical part between the lower and upper cylinder.

A supplier of steam may be a boiler, or an outlet of steam in another system utilizing pressurized steam, for example an outlet of a turbine.

The first fluid path inside the inner cylindrical part and the second fluid path between the outer enclosure of the vessel and the inner cylindrical part define the recirculation of the superheated steam. The flow of superheated steam is established by the impeller which is located in the lower cylindrical part below the steam permeable bottom and/or between the inner cylindrical part and the steam permeable bottom of the lower cylindrical part in order to establish a high pressure below the steam permeable bottom, which in turn establishes a fluid bed and the re-circulating flow of superheated steam. The inner cylindrical part includes the heat exchanger which maintains the re-circulating steam in a superheated state for avoiding any condensation to occur within the vessel.

The drying is taking place by superheated steam contacting the moist particulate material and transferring some of its heat to the moist particles. The liquid content of the moist particulate material will vaporize and the vapour becomes part of the circulating steam. The heat energy required for the vaporization and thereby removed from the superheated steam is replenished at the heat exchanger in order to avoid condensation of the superheated steam into liquid within the vessel. Any surplus steam may release the dryer through the top part of the vessel e.g. through a valve. The vessel also includes means for inducing a circumferential flow component in order to cause the particulate material to move slowly in a circumferential direction from the inlet to the outlet.

The partitioning walls serve to delimit the lower cylindrical part into several chambers. The first chamber is the inlet chamber, which is connected to a closed off screw conveyor or the like for injecting the moist particulate material into the inlet chamber. The outlet chamber also comprises a closed off screw conveyor or the like for discharging the dry particulate material. The intermediate chambers are located between the inlet chamber and the outlet chamber. The partitioning walls include openings for allowing particulate material to be transported from the inlet chamber to the outlet chamber via the intermediate chambers. The inlet chamber and the intermediate chambers receive superheated steam from a steam permeable bottom and thus constitute drying chambers.

Within the drying chambers a fluid bed and a flow is established which maintains most of the particulate material in the lower cylindrical part and increases the contact between the superheated steam and the particulate material.

The outlet chamber preferably does not have a steam permeable bottom to allow the particulate material to settle before being discharged. The number of chambers determines influences the standard deviation of the distribution retention time. Increasing A the number of chambers reduces the standard deviation of the retention time of the particulate material.

The particulate material arriving at the first drying chamber, i.e. the inlet chamber, is moist and contains a large portion of liquid and thus tends to be heavy and clogging up the chamber. These heavy particles require a high flow velocity. This leads to less lift in the fluid bed, less whirling motion of the flow and less distribution of the particulate material which results in the accumulation of moist particulate material in some parts of the inlet chamber. The particulate material arriving at the last drying chamber before the outlet chamber in which the now dried particulate material is ejected, is substantially dry.

Thus, in order to ensure the formation of a well-established whirling flow of superheated steam within the inlet chamber, the steam permeable bottom is divided into several subsections where a number of these subsections is constructed having a louvered plate section with a number of louvers for directing a flow of the superheated steam in a direction towards the lower cylindrical inner wall.

Research by the applicant has proven that the arrangement of the subsections having louvered plate sections defining first and second blowing directions being different from zero degrees, generates one or more whirling movements of the superheated steam in different directions, which increases the flow and the velocity of the whirling motions and enhances the drying process. This also leads to an improved mixing of the new and the semi-dried particles.

The inlet chamber is constructed with a number of subsections, however, not all subsections may be constructed having louvers, i.e. the first subsection being closest to the inlet may be constructed with or without louvers and the last subsection or a number of any intermediate subsections may be constructed without having louvers.

According to a further embodiment of the first aspect, the first angle is in the range of 7.5 to 90 degrees numerically larger than the second angle, preferably in the range of 10 to 60 degrees numerically larger than the second angle.

According to a further embodiment of the first aspect, the steam permeable bottom of at least the inlet chamber comprises a third subsection being intermediate the first and the second subsection, the intermediate third subsection comprises at least one louvered plate section having a plurality of louvers arranged in a third specific direction for directing the superheated steam in a blowing direction towards the lower cylindrical inner wall, the third specific direction of the louvers defining a third angle in relation to the respective third radial centreline, where the third angle is different from 0 and between 0 to 90 degrees.

The louvers of the third subsection is arranged at an angle in relation to the respective radial centreline, enhances the whirling movement of the flow of superheated steam. The third angle may by substantially equal to or numerically larger than the first angle. The third angle may in a different embodiment be substantial equal to or numerically larger than the second angle.

According to a further embodiment of the first aspect, at least the inlet chamber comprises a transition plate section, arranged as a transition between the steam permeable bottom and the inner cylindrical part. The transition plate section comprises a louvered plate section for directing a flow of superheated steam in a blowing directing towards the lower cylindrical inner wall, where the blowing direction defines an angle in a vertical direction, and compared to a horizontal plane, the angle being between −80 and 80 degrees, preferably between −60 and 60 degrees, more preferably between −40 and 40 degrees, most preferably between −40 and 0 degrees.

When the bulk particulate material is dried and circulated in a whirling manner inside the chambers, a large part of the bulk particulate material will whirl in a downwards direction at the inner cylindrical part, along the steam permeable bottom in a direction towards the lower cylindrical inner wall and in an upwards direction along the lower cylindrical inner wall. The louvers in the transition plate section establishes a blowing effect in a direction outwards from the inner cylindrical part which enhances the circulation and increases the velocity of the whirling motions.

The blowing direction of the louvers in the transition plate section is directed to the lower cylindrical inner wall and angled in a circumferential direction substantial similar to the louvers of the steam permeable bottom of the respective subsection. Alternatively, the louvers of the transition plate section may direct a flow of superheated steam towards the lower cylindrical inner wall in a blowing direction substantially equal to the respective radial centreline.

According to a further embodiment of the first aspect, the subsections comprise a plurality of louvered plate sections, said specific direction of two or more of said louvered plate sections defining a different angle in relation to said radial centreline respectively.

Each subsection comprises a number of louvered plate sections each defining an angle between the radial centreline, respectively, and the specific direction of the louvered plate sections, where the angle of the louvered plate sections being arranged towards the lower cylindrical part is preferably larger, compared to the angle of the louvered plate sections arranged towards the inner cylindrical part.

According to a further embodiment of the first aspect, the steam permeable bottom comprises a plurality of perforations for guiding said superheated steam in a substantial vertical blowing direction, and an opening area of the louvers of the inlet chamber defines an area being 10% to 90% of the total opening area of all of the perforations and lovers of the steam permeable bottom of the inlet chamber, preferably between 20% to 60%, more preferably between 30% and 50%, such as approximate 40% to 50%.

The perforations may be located in a regular pattern across the surface of the bottom or may be located in groups. The combination of the louvers and the perforations enhances a whirling movement of the flow of superheated steam.

According to a second aspect of the present invention, the above objects and advantages are obtained by:

a bottom plate component of a steam permeable bottom for an apparatus for drying bulk particulate material where the bottom plate component comprises at least one subsection defining a radial centreline, the subsection having a louvered plate section having a plurality of louvers arranged in a specific direction, for directing the superheated steam in a blowing direction, towards the lower cylindrical inner wall, the specific direction of the louvers defining an angle in relation to the first radial centreline, the angle being numerically in the range of 7.5 degrees to 90 degrees, preferably between 10 degrees and 75 degrees, preferably between 11.5 and 60 degrees.

It is evident that the bottom plate according to the second aspect may be used together with the apparatuses according to the first aspect.

According to a third aspect of the present invention, the above objects and advantages are obtained by:

a method of drying bulk particulate materials by providing an apparatus, the apparatus comprising:

a vessel defining a lower cylindrical part having a lower cylindrical inner wall and defining a first cross-sectional area being perpendicular to the length of the lower cylindrical part and an upper cylindrical part defining a second cross-sectional area being perpendicular to the length of the upper cylindrical part;

an inner cylindrical part centrally located within the upper cylindrical part and the lower cylindrical part of the vessel for establishing a first fluid path from the upper cylindrical part to the lower cylindrical part within the inner cylindrical part and a second fluid path from the lower cylindrical part to the upper cylindrical part outside the inner cylindrical part;

a number of partitioning walls extending radially within the lower cylindrical part between the lower cylindrical part and the inner cylindrical part and defining in the lower cylindrical part an inlet chamber, an outlet chamber and a number of intermediate chambers located between the inlet chamber and the outlet chamber in a circumferential direction, the inlet chamber comprising an inlet, the outlet chamber comprising an outlet, the inlet chamber and the intermediate chambers each defining a steam permeable bottom, the outlet chamber preferably defining a non-steam permeable bottom, the steam permeable bottom of said inlet chamber being adapted to receive superheated steam from said impeller, the steam permeable bottom is arranged for directing the flow of superheated steam in a number of directions towards the lower cylindrical inner wall, and in directions different from a radial direction of the steam permeable bottom;

a heat exchanger located within said inner cylindrical part, and an impeller, the method comprising the steps of:

maintaining within the vessel a superheated steam at a pressure equal to or larger than the ambient pressure surrounding the vessel, receiving moist bulk particulate material at said inlet, heating the steam within said heat exchanger, generating a flow of superheated steam along the first fluid path from the upper cylindrical part through the heat exchanger within the inner cylindrical part to the lower cylindrical part, and via the steam permeable bottom, directing the flow of superheated steam in a number of directions different from the radial direction, towards the lower cylindrical inner wall, and generally along the second fluid path from the lower cylindrical part to the upper cylindrical part outside the inner cylindrical part, by using the impeller, hereby increasing the velocity and whirling movement of the superheated steam, and ejecting dry bulk particulate material at the outlet.

According to a further embodiment of the third aspect, where via the steam permeable bottom the flow of superheated is directed in a first direction towards the lower cylindrical inner wall and defining a first angle in relation to the radial direction and a second direction towards the lower cylindrical inner wall and defining a second angle in relation to the radial direction, the first angle being different from the second angle Research performed by the applicant has shown, that by using the above described method for drying bulk particulate materials with superheated steam by establishing one or more whirling motions in different directions within the first drying chamber, accumulation of material within the first drying chamber is avoided, and a mixing of the particles already semi-dried within the first drying chamber and new particles is accomplished. The whirling motions in different directions allows the particulate material to distribute more evenly within the first drying chamber, which results in a more effective drying.

BRIEF DESCRIPTION OF THE DRAWINGS

FIG. 1A illustrates a side sectional view of an apparatus for drying bulk particulate material, in particular drying of beet pulp.

FIG. 5A illustrates and inner perspective view of the lower part of the inlet chamber.

FIG. 5B illustrates a blow-up of the steam permeable bottom.

FIG. 5C illustrates a blow-up of the transition plate section.

FIG. 5D illustrates a cross-sectional view of the louvered plate section along line AA.

FIG. 5E illustrates a cross-sectional view of the louvered transition plate section along line BB.

DETAILED DESCRIPTION OF THE DRAWINGS

Figure 1B:
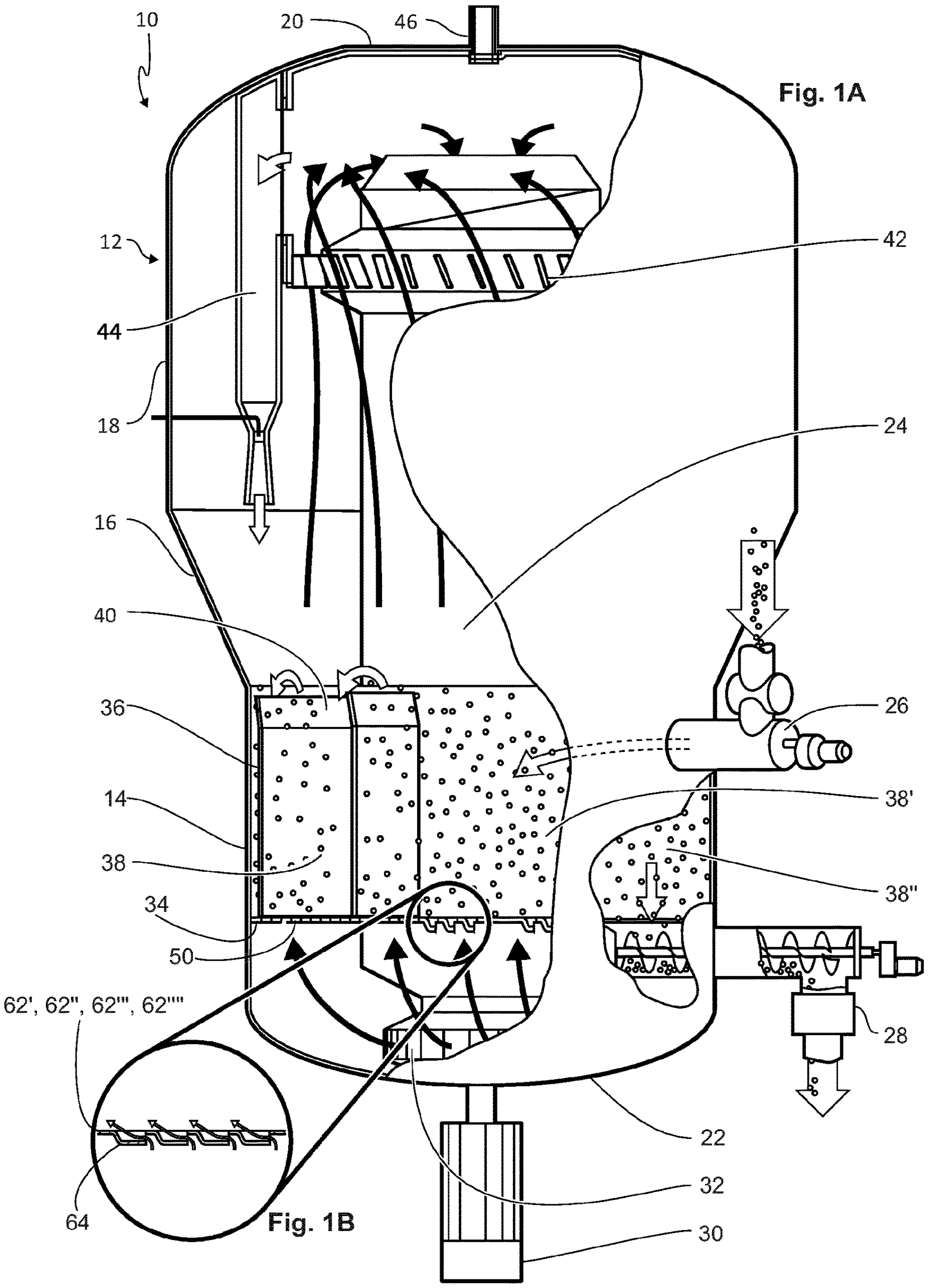
FIG. 1B is a blow-up of a sectional view of the steam permeable bottom.

FIG. 1A shows a side sectional view of an apparatus 10 for drying bulk particulate materials, in particular the drying of beet pulp. The apparatus 10 comprises a vessel 12, having a lower cylindrical part 14, an intermediate conical part 16 and an upper cylindrical part 18. The vessel may be constructed without the conical part, hereby the lower (14) and upper cylindrical part (18) having the same cross-sectional area.

The vessel 12 is closed off by a top 20 and a bottom 22. The vessel 12 further comprises an inner cylindrical part 24 extending within the vessel between the upper cylindrical part 18 and the lower cylindrical part 14. The inner cylindrical part 24 includes a heat exchanger (not shown) and defines a first fluid path from the upper cylindrical part 18 to said lower cylindrical part 14, within the inner cylindrical part 24 and a second fluid path from the lower cylindrical part 14 to the upper cylindrical part 18 outside the inner cylindrical part, as shown by the arrows.

The vessel 12, further comprises an inlet 26, which may comprise a screw conveyor for introducing moist particulate material into the lower cylindrical part 14 of the vessel 12, as shown by the arrow, and an outlet 28 which may also comprise a screw conveyor for ejecting dry particulate material from the lower cylindrical part 14 of the vessel 12, as shown by the arrow. The inlet 26 is located above and circumferentially displaced relative to the outlet 28. A motor 30 is located below the vessel 12 for driving an impeller 32, located in the lower cylindrical part 14 below the inner cylindrical part 24. The impeller 32 generates a flow of superheated steam along the above-mentioned fluid paths. A steam permeable bottom 34 is located above the impeller 32. The steam permeable bottom 34, comprises a plurality of perforations 50 for directing the superheated steam in a substantially vertical direction and a plurality of louvered plate sections 62'-62"" having a plurality of louvers 64 for directing the superheated steam towards the lower cylindrical inner wall.

A number of partitioning walls 36 are radially extending between the lower cylindrical part 14 and the inner cylindrical part 24 and dividing the space between the lower cylindrical part 14 and the inner cylindrical part 24 into a number of chambers 38. The chamber located at the inlet 26, is designated inlet chamber 38' and the chamber located at the outlet 28, is designated outlet chamber 38". Typically, the inlet chamber 38' and the outlet chamber 38" are located adjacent each other, however, the particulate material should not be able to move directly from the inlet chamber 38' to the outlet chamber 38" without passing the intermediate chambers 38. The moist particulate material is received in the inlet chamber 38' on a fluid bed established by the flow of superheated steam above the steam permeable bottom 34. The partitioning walls 36 include whirling blades 40 for inducing a circumferential whirl for transporting the particulate material from the inlet chamber 38' to the outlet chamber 38" via the intermediate chambers 38 as shown by the arrows. The outlet chamber 38" preferably has a non-permeable bottom, which allows the dried particulate material to be ejected via the outlet 28 as shown by the arrow.

The upper cylindrical part 18 of the vessel 12 comprises guide blades 42 for generating a cyclone field in the upper cylindrical part 18. The guide blades 42 will establish a whirling movement of the flow of superheated steam corresponding to the above-mentioned circumferential whirl and force any particles outwardly, which have been lifted from the lower cylindrical part 14 through the intermediate conical part 16 into the upper cylindrical part 18. The outwardly forced particles will be collected in a cyclone 44 and returned to the lower cylindrical part 14 as shown by the arrows. The superheated steam will be introduced into the inner cylindrical part 24 and be reheated by the heat exchanger assembly before returning to the impeller 32. A small portion of the superheated steam will escape the vessel 12 via a centrally located steam exit 46. The superheated steam exiting the vessel 12 is subsequently cooled off via a heat exchanger.

The drying of the moist particulate material is effected on the fluid bed above the steam permeable bottom of the inlet chamber 38' and the intermediate chambers 38. Each chamber 38 may include further blades or similar means for establishing a whirling flow in the radial direction of the chamber 38. The whirling flow will increase the distribution of the particulate material within the chambers 38 and thereby increase the contact between the superheated steam and the particulate material, thereby increasing the vaporization of fluid from the particulate material and improving the drying.

FIG. 1B is a blow-up of a sectional view of the steam permeable bottom 34. The blow-up illustrates a louvered plate section 62'-62"" having louvers 64. The figure illustrates the punched material of the louvers facing the impeller and a blowing direction in a direction of the second fluid path and in an angle in a vertical direction between 0 and 90 degrees compared to a horizontal plane, preferably less than 60 degrees.

Figure 2:
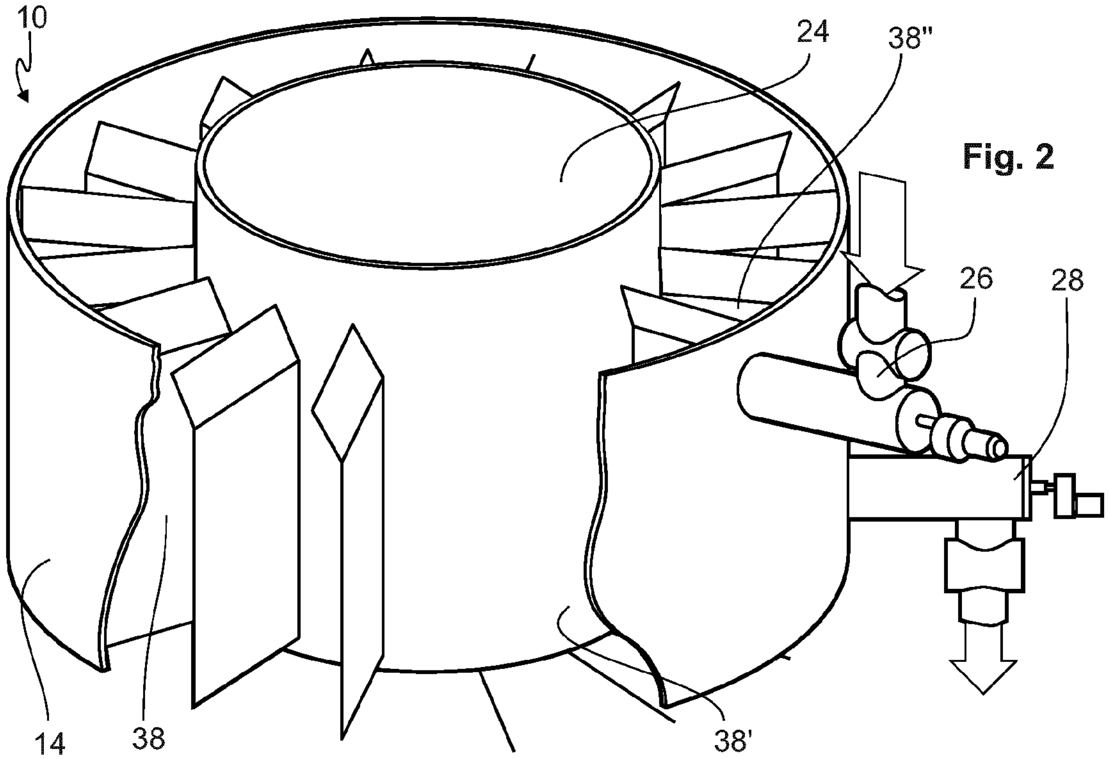
FIG. 2 illustrates a perspective view of the lower cylindrical part of the apparatus.

FIG. 2 shows a perspective view of the lower cylindrical part 14 of the apparatus 10. The inlet chamber 38' is larger than the intermediate chambers 38 and the outlet chamber 38" for allowing a larger portion of the superheated steam to enter the inlet chamber 38' compared to the intermediate chambers 38. In this way the heavy liquid containing particulate material entering the inlet chamber 38' may be distributed over a larger area, reducing the flow resistance and thereby both preventing clogging and improving the drying.

Figure 3A:
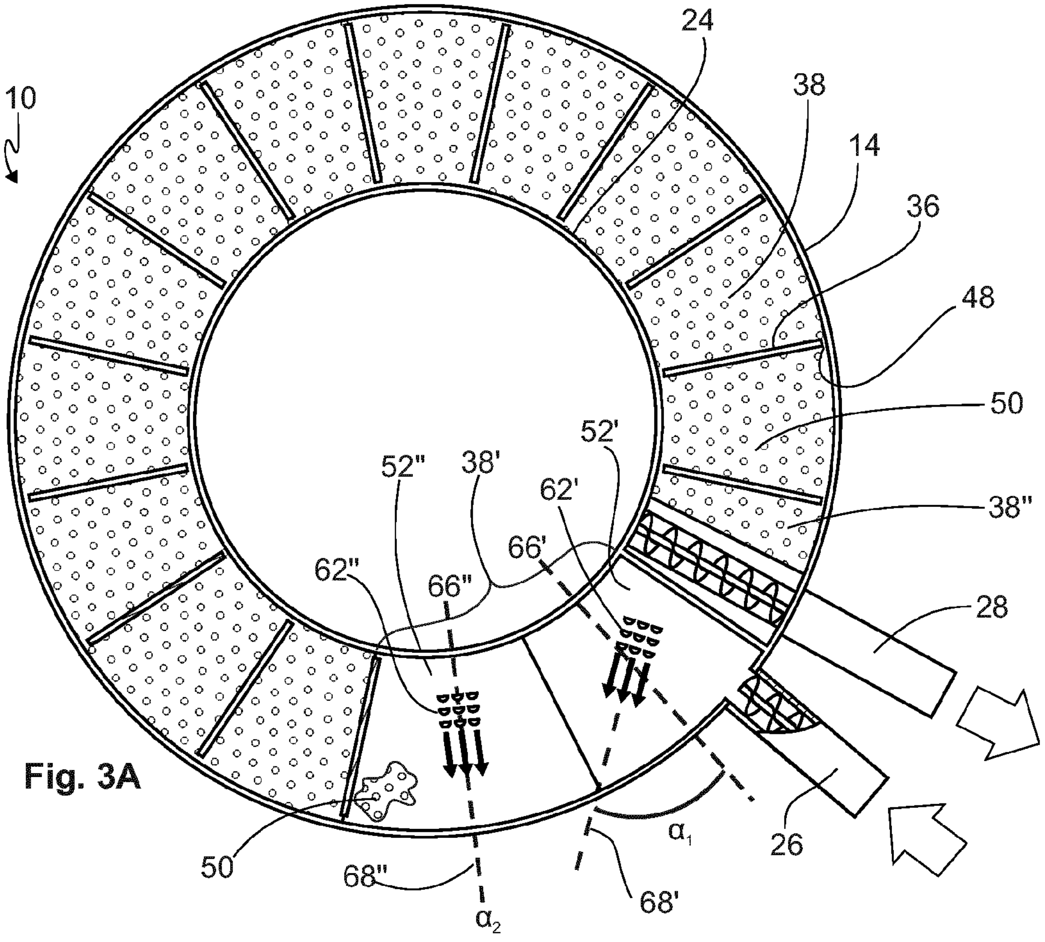
FIG. 3A-3C illustrates a top sectional view of different embodiments of the lower cylindrical part of the apparatus.
Figure 3B:
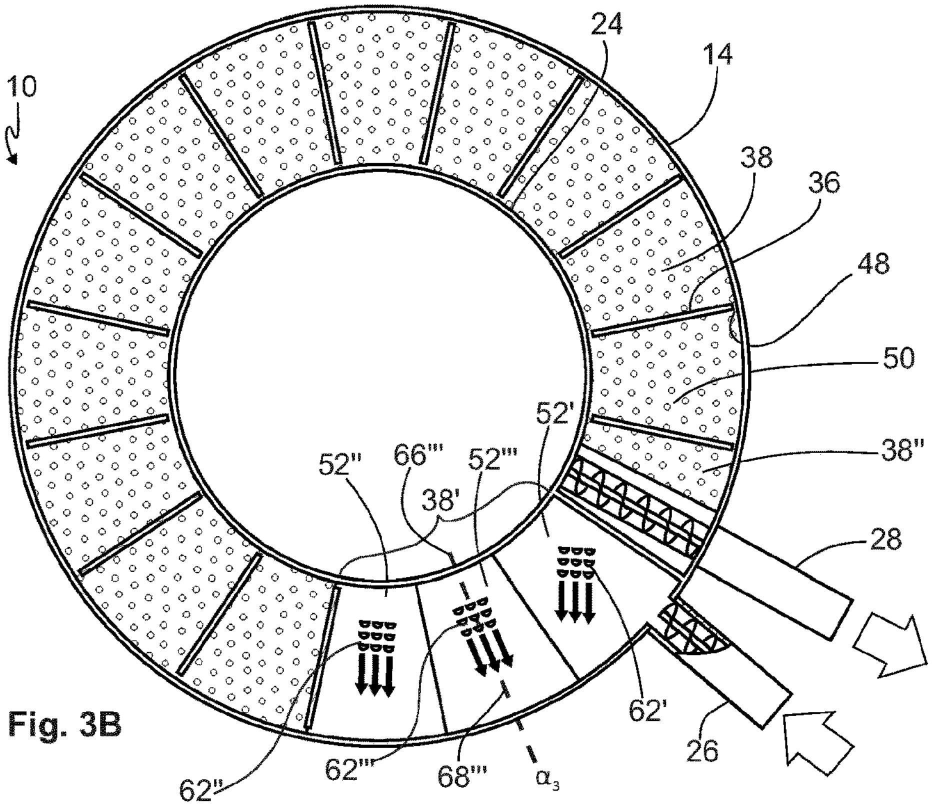
Figure 3C:
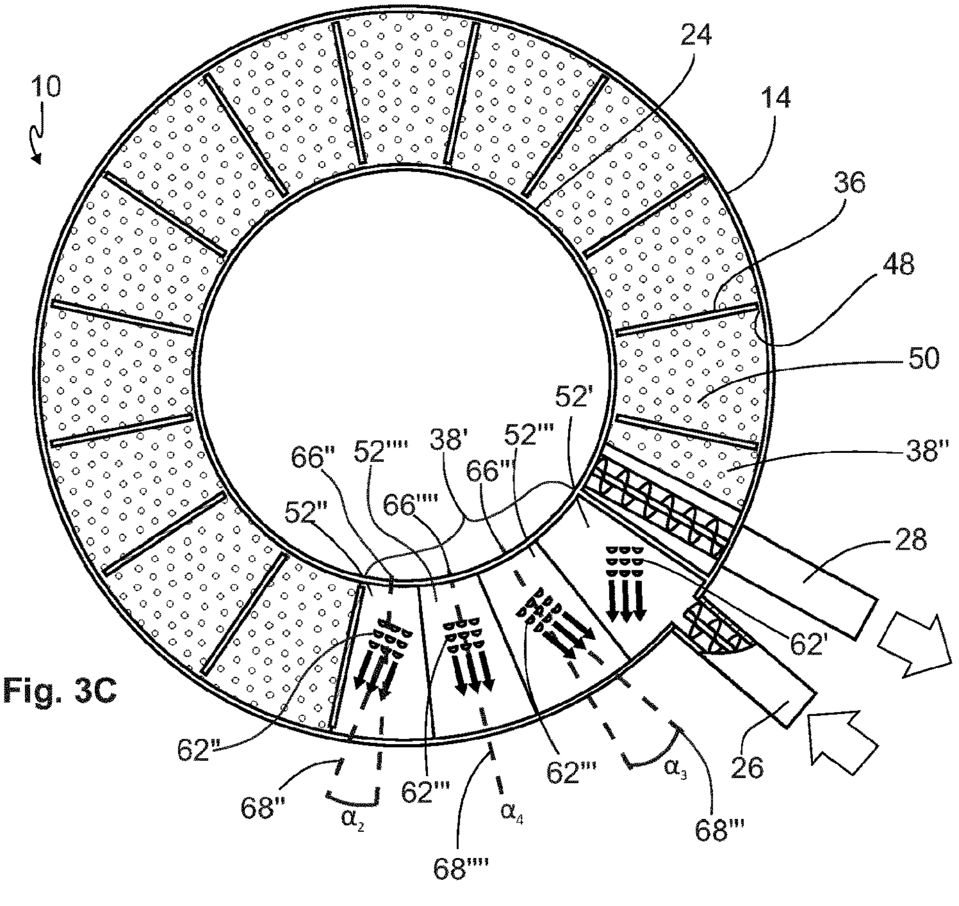

FIG. 3A-3C shows a top sectional view of different embodiments of the lower cylindrical part 14 of the apparatus 10.

In FIG. 3A, the inlet chamber 38' is illustrated having two subsections, a first subsection 52' and a second subsection 52".

In FIG. 3B, the inlet chamber 38' is illustrated having three subsections, a first subsection 52', a second subsection 52", and a third subsection 52'".

FIG. 3C illustrates an embodiment where the inlet chamber 38' is having four subsections, a first subsection 52', a second subsection 52", a third subsection 52'" and a fourth subsection 52"". The inlet chamber may in a further embodiment (not shown) be constructed having a further number of intermediate subsections e.g. three, four or five subsections or any larger number of intermediate subsections.

The radial partitioning walls 36 define the circular sector shape of the chambers 38, 38', 38". The particulate material may move in a clockwise direction from the inlet chamber 38' to the outlet chamber 38", via all of the intermediate chambers 38, by flowing above the partition walls 36 or through apertures 48 which may optionally exist in the partition walls 36.

The subsections 52'-52'" of the inlet chamber 38', besides the louvers 54, also comprise perforations 50 (as illustrated in second subsection 52" of FIG. 3A), for directing a part of superheated steam through the steam permeable bottom 34 and in a substantial vertical direction.

In FIG. 3A the first subsection 52' and the second subsection 52" is illustrated each having a louvered plate section 62'-62" with a number of louvers 64 for directing a part of the superheated steam in a direction towards the lower cylindrical inner wall of the lower cylindrical part 14.

The first subsection 52' is illustrated having a first louvered plate section 62' arranged in a specific direction 68' such that the blowing direction of the first louvered plate section 62' and the first radial centreline 66' of the first subsection 52' defines a first angle ($\alpha_1$) which in the illustrated embodiment is approx. 60 degrees. The second subsection 52" is illustrated having a second louvered plate section 62" arranged in a specific direction 68" such that the blowing direction of the second louvered plate section 62" of the second subsection 52" and the second radial centreline 66" defines a second angle ($\alpha_2$). The blowing direction of the louvers in the second subsection 52" is substantially equal to the second radial centreline 66" of the second subsection 52" and the second angle ($\alpha_2$) is therefore substantially zero. In an alternative embodiment (not shown), the blowing direction of the louvers in the second subsection 52" may be different from the second radial centreline 66" of the second subsection 52" and the second angle ($\alpha_2$) hereby being numerically different from zero. The first angle is in the illustrated embodiment different from zero and the blowing direction of the first louvered plate section 62' is in a direction towards the outlet. However, in an alternative embodiment, the blowing direction of the first louvered plate section 62' may be directed in an angle being substantial zero or in an angle different from zero and in a direction towards the inlet (26).

In FIG. 3B, the first and second louvered plate sections 62', 62" of the first and second subsection 52', 52" are arranged similar as described in relation to FIG. 3A. The third subsection 52'" is illustrated having a third louvered plate section 62'", arranged with a third specific direction such that the blowing direction and the third radial centreline 66'" of the third subsection 52 defines a third angle ($\alpha_3$). The third angle ($\alpha_3$) is in the illustrated embodiment substantially numerically equal to the second angle ($\alpha_2$). In an alternative embodiment, the blowing direction of the louvers in the third subsection 52'" may be different from the third radial centreline 66'" and the third angle ($\alpha_3$) hereby being different from zero.

FIG. 3C illustrates an embodiment of the inlet chamber 38' where the blowing direction of the first subsection 52' is similar to the embodiments illustrated in FIGS. 3A and 3B. The embodiment in FIG. 3C, illustrates the second, third and fourth subsection 52"-52"", each having louvered plate sections 62"-62"" arranged in specific directions 68"-68"" such that a blowing direction of each louvered plate section 62"-62"" and the second, third and fourth radial centrelines 66"-66"" of the respective subsection defines a second angle ($\alpha_2$), a third angle ($\alpha_3$) and a fourth angle ($\alpha_4$). The second angle ($\alpha_2$) is illustrated being substantially equal to the first angle. The third angle ($\alpha_3$) is illustrated being different from zero and e.g. approx. −20 degrees, and in a direction of the inlet (26). The fourth angle ($\alpha_4$) is illustrated being substantially equal to the respective radial centreline.

Figure 4:
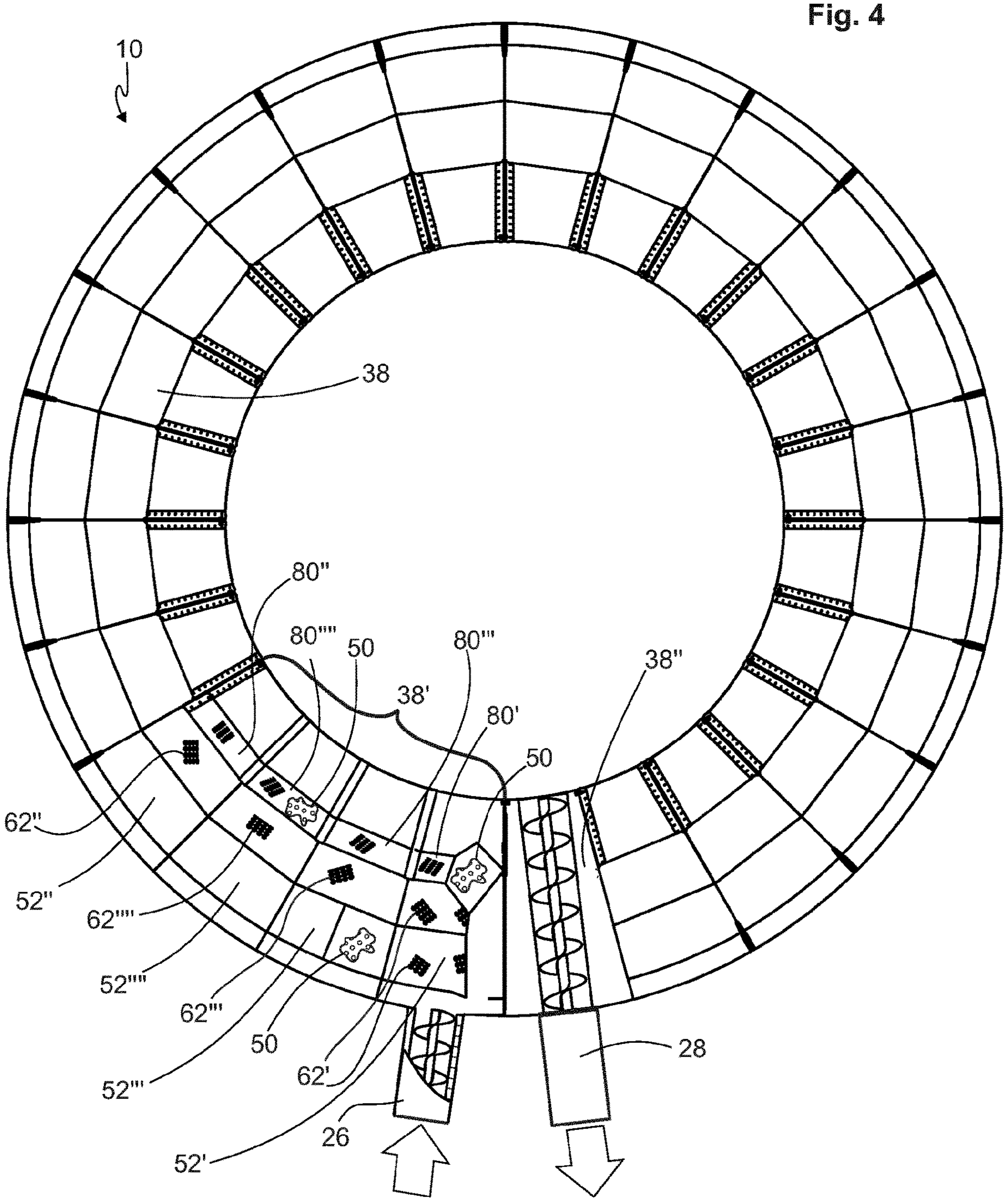
FIG. 4 illustrates a top sectional view of the lower cylindrical part of the apparatus.

FIG. 4 shows a top sectional view of the lower cylindrical part 14 of the apparatus 10. The apparatus is illustrated with an inlet chamber 38' and outlet chamber 38" and 19 intermediate chambers 38. The apparatus, however, may be arranged with any number of intermediate chambers between 6 and 40, such as between 10 and 25, such as between 12 and 20. In each of the first subsection 52' and the third subsection 52'" the steam permeable bottom 34 comprises more than one louvered plate section 62', 62'". In the first subsection 52', the bottom 34 comprises four louvered plate sections 62', and in the third subsection 52'", the bottom 34 comprises two louvered plate sections 62'". The further subsections of the inlet chamber 38' are illustrated each having one louvered plate section. The steam permeable bottom 34 of each of the subsections 52'-52"" of the inlet chamber, may be arranged with a different number of louvered plate sections. Between the steam permeable bottom 34 and the inner cylindrical part 24, the apparatus 10 is illustrated having transition plate sections 80'-80"" having louvers, and arranged as a transition between the steam permeable bottom 34 and the inner cylindrical part 24.

FIG. 5A illustrates an inner perspective view of a lower part of the inlet chamber 38'. The figure illustrates an inlet chamber 38' similar to the inlet chamber 38' illustrated in FIG. 4, and the steam permeable bottom 34 is arranged with a number of louvered plate sections 62'-62"", as described in relation to FIG. 4.

Each subsection 52'-52"" of the inlet chamber 38' is arranged with a transition plate section 80'-80"", being angled in relation the bottom 34 and the inner cylindrical part 24. The transition plate sections 80'-80"", each has a transition louvered plate section 82'-82"" with a number of louvers 64, for directing a flow of superheated steam away from the transition plate sections 80'-80"" and towards the lower cylindrical part 14. The blowing direction of the transition louvered plate sections 80'-80"" is directed away from the inner cylindrical part 24 and angled in a circumferential direction which may substantial similar to the louvers of the bottom 34 of each respective subsection. In an alternative embodiment, the blowing direction of the transition louvered plate sections 82'-82"" is directed away from the inner cylindrical part 24 and angled in a circumferential direction being different to the louvers of the bottom 34 of each respective subsection. Perforations 50 are illustrated in the steam permeable bottom 34 and the transition plate sections.

FIG. 5B-5C illustrates a blow-up of the louvered plate sections 62''', 82''' illustrated with a number of louvers 64 arranged in regular rows. However, there may be any different number of louvers, which also may be arranged in a shifted pattern. The above, complies to all of the louvered plate sections 62'-62'''' and 82'-82''''. As shown in FIG. 5D, the blowing direction also defines an angle in relation to a vertical direction. The angle is between 0 and 90 degrees, and preferably less than 60 degrees.

FIG. 5E illustrates a cross-sectional view of the transition louvered plate section 82''' along line BB and illustrates the punched plate material of each louver 64 is arranged on the underside of the transition louvered plate section 82''' and hereby facing the impeller 32 (not shown in FIG. 5A).

Figure 6A:
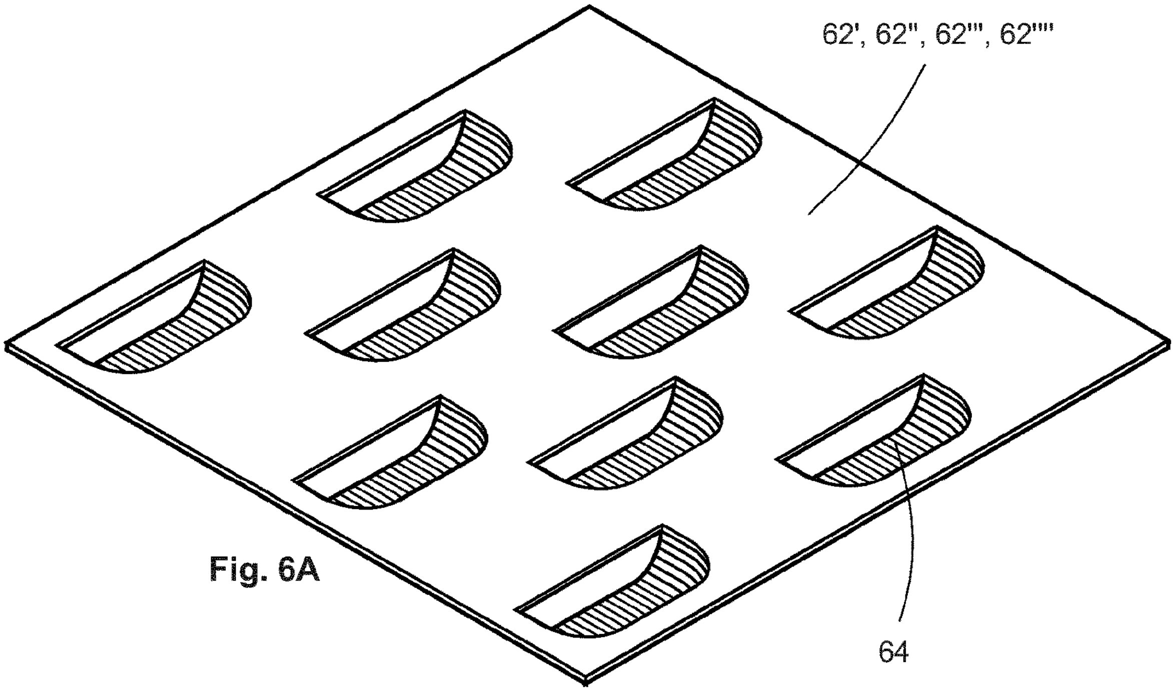
FIG. 6A illustrates a perspective view of a top surface side of the louvered plate section.

FIG. 6A illustrates a perspective view of a top surface side of the louvered plate sections 62'-62''''.

Figure 6B:
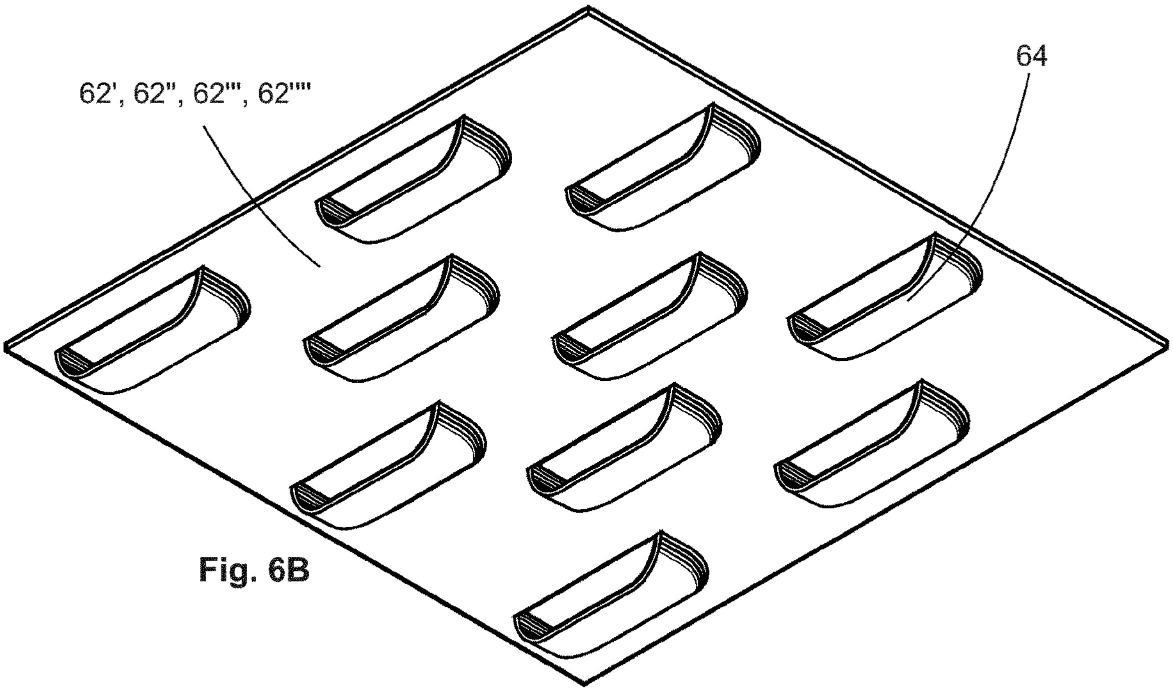
FIG. 6B illustrates a perspective view of a bottom surface side of the louvered plate section.

FIG. 6B illustrates a perspective view of a bottom surface side of the louvered plate sections 62'-62''''.

Figure 7:
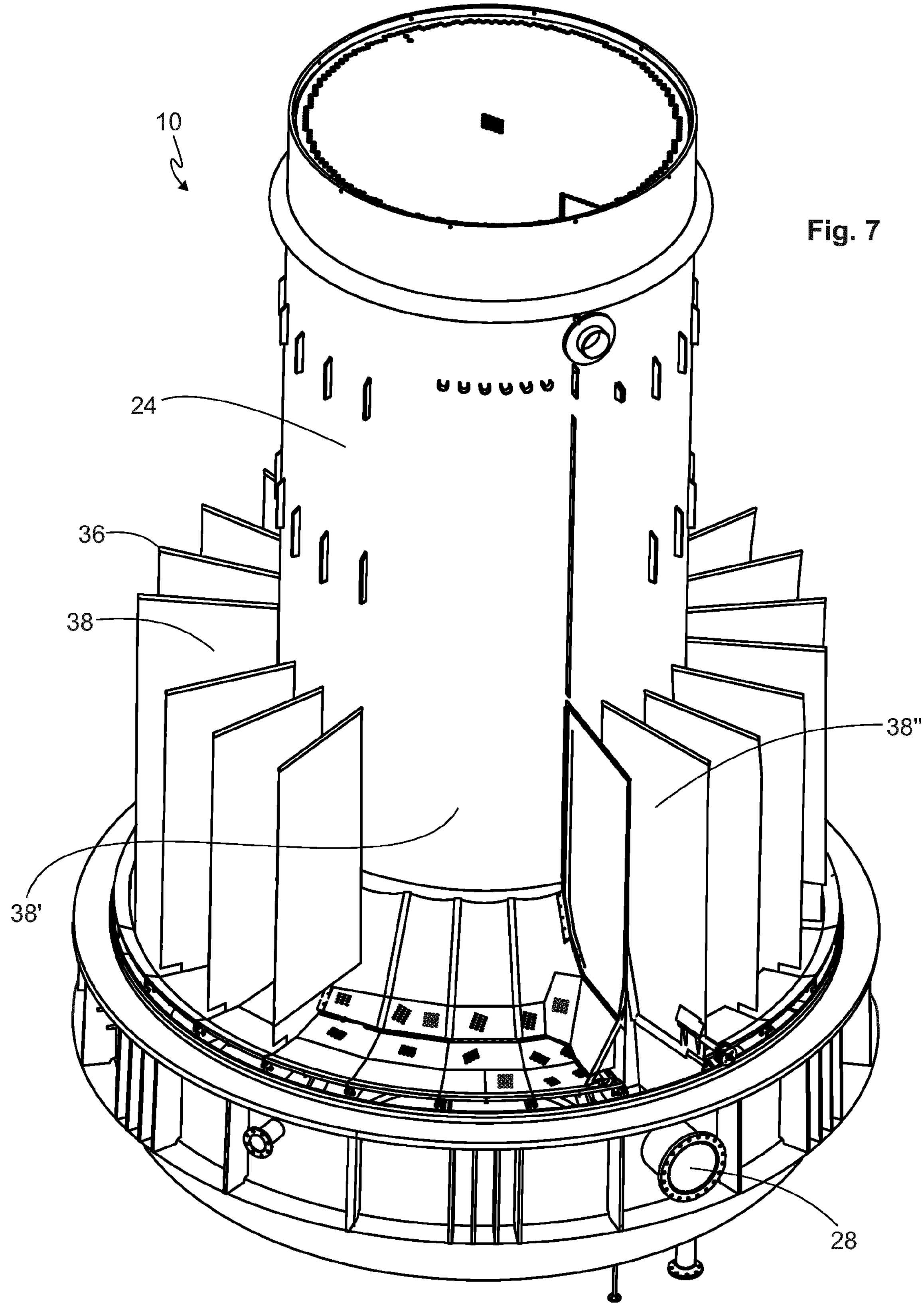
FIG. 7 illustrates an interior perspective view of the apparatus for drying bulk particulate material.

FIG. 7 illustrates an interior perspective view of the apparatus 10. The apparatus 10 is illustrated without the inlet 26, the lower cylindrical part 14, the upper cylindrical part 18 and the top of the inner circular part having guide blades 42. The apparatus 10 has a number of partitioning walls 36 dividing the lower cylindrical part into a number of chambers 38, 38', 38'' where the inlet chamber 38' is located adjacent the outlet chamber 38''. The bulk particulate material is not able to move directly from the inlet chamber 38' to the outlet chamber 38'' without passing the intermediate chambers 38, which is prevented by a wall (not shown), extending between the inner cylindrical part 24 and the upper and lower cylindrical part 14. The outlet chamber 38'' preferably has no steam permeable bottom 34, which allows the bulk particulate material to be withdrawn from the apparatus 10 via the outlet 28.

The inlet chamber 38' comprises four subsections 52'-52'''', arranged similar as described in relation to FIGS. 4 and 5A and is illustrated without the perforations 50 which is not to be excluded from the teaching. The larger size of the inlet chamber 38' compared to the intermediate chambers 38 and the outlet chamber 38'' is evident, which larger size of the inlet chamber' enhances the drying process of the bulk particulate material.

Although the present invention has been described with reference to several advantageous embodiments, among which one constitutes the presently preferred embodiment, a person skilled in the art will readily recognize that the steam dryer itself may be implemented in numerous ways incorporating the technical features of, among others, the steam dryers known from the publications mentioned in the introduction to the present specification. Any such modification or use of the teachings of the present invention in combination with a prior art steam dryer is consequently to be considered part of the present invention and to be construed encompassed by the protective scope defined in the appending points.

REFERENCE NUMERALS

10. Apparatus for drying bulk particulate material
12. Vessel
14. Lower cylindrical part
16. Intermediate conical part
18. Upper cylindrical part
20. Top
22. Bottom
24. Inner cylindrical part
24'. Upper inner cylindrical part
26. Inlet
28. Outlet
30. Motor
32. Impeller
34. Steam permeable bottom
36. Partitioning walls
38. Intermediate chambers
38'. Inlet chamber
38''. Outlet chamber
40. Whirling blades
42. Guide blades
44. Cyclone
46. Steam exit
48. Aperture
50. Perforations
52'. First subsection
52''. Second subsection
52'''. Third subsection
52''''. Fourth subsection
62'. First louvered plate section
62''. Second louvered plate section
62'''. Third louvered plate section
62''''. Fourth louvered plate section
64. Louver
66'. First radial centreline
66''. Second radial centreline
66'''. Third radial centreline
66''''. Fourth radial centreline
68'. First specific direction
68''. Second specific direction
68'''. Third specific direction
68''''. Fourth specific direction
80'. First transition plate section
80''. Second transition plate section
80'''. Third transition plate section
80''''. Fourth transition plate section
82'. First transition louvered plate section
82''. Second transition louvered plate section
82'''. Third transition louvered plate section
82''''. Fourth transition louvered plate section
$\alpha_1$. First angle
$\alpha_2$. Second angle
$\alpha_3$. Third angle
$\alpha_3$. Fourth angle

The invention claimed is:

1. An apparatus for drying bulk particulate material, said apparatus comprising:

a vessel capable of maintaining superheated steam at a pressure equal to or larger than the ambient pressure surrounding said vessel, said vessel defining a lower cylindrical part having a lower cylindrical inner wall and defining a first cross-sectional area being perpendicular to the length of the lower cylindrical part and an upper cylindrical part having an upper cylindrical inner wall and defining a second cross-sectional area being perpendicular to the length of the upper cylindrical part, an inner cylindrical part centrally located within said upper cylindrical part and said lower cylindrical part of said vessel for establishing a first fluid path from said upper cylindrical part to said lower cylindrical part within said inner cylindrical part and a second fluid path from said lower cylindrical part to said upper cylindrical part outside said inner cylindrical part, a number of partitioning walls extending radially within said lower cylindrical part between said lower cylindrical part and said inner cylindrical part and defining in said lower cylindrical part an inlet chamber, an outlet chamber and a number of intermediate chambers located between said inlet chamber and said outlet chamber in a circumferential direction, said inlet chamber comprising an inlet for receiving a moist bulk particulate material, said outlet chamber comprising an outlet for ejecting a dry bulk particulate material, said inlet chamber and said intermediate chambers each defining a steam permeable bottom, a heat exchanger assembly located within said inner cylindrical part for heating said superheated steam, an impeller for generating a flow of superheated steam within said vessel and along said first fluid path from said upper cylindrical part through said heat exchanger within said inner cylindrical part to said lower cylindrical part and generally along said second fluid path from said lower cylindrical part to said upper cylindrical part outside said inner cylindrical part, said steam permeable bottom of said inlet chamber being divided into a number of subsections including a first subsection and a second subsection, each subsection defining a first and a second radial centerline, respectively, said first subsection and said second subsection each having at least one louvered plate section comprising a plurality of louvers arranged in a first and a second specific direction, respectively, for directing said superheated steam in a first and second blowing direction, towards said lower cylindrical inner wall, said specific direction of said louvers of said first subsection defining a first angle in relation to said first radial centerline, said specific direction of said louvers of said second subsection defining a second angle in relation to said second radial centerline, and said first angle and/or said second angle, being different from 0 degrees;

wherein said steam permeable bottom comprises a plurality of perforations for guiding said superheated steam in a substantial vertical blowing direction and wherein an opening area of said louvers of said inlet chamber defines an area being 10% to 90% of a total opening area of all of said perforations and louvers of said steam permeable bottom of said inlet chamber.

2. The apparatus according to claim 1, wherein said first angle is in the range of 7.5 to 90 degrees numerically larger than said second angle.

3. The apparatus according to claim 1, wherein said steam permeable bottom of at least said inlet chamber having a third subsection is intermediate said first and said second subsection and having a third radial centerline, said intermediate third subsection having at least one louvered plate section comprising a plurality of louvers arranged in a third specific direction for directing said superheated steam in a blowing direction towards said lower cylindrical inner wall, said third specific direction of said louvers defining a third angle in relation to said respective third radial centerline, wherein said third angle being different from 0 degrees and between 0 to 90 degrees.

4. The apparatus according to claim 1, wherein said subsections comprise a plurality of louvered plate sections, said specific direction of two or more of said louvered plate sections defining a different angle in relation to said radial centerline respectively.

5. A method of drying bulk particulate materials with an apparatus, said apparatus comprising:

a vessel defining a lower cylindrical part, having a lower cylindrical inner wall and defining a first cross-sectional area being perpendicular to the length of the lower cylindrical part and an upper cylindrical part defining a second cross-sectional area being perpendicular to the length of the upper cylindrical part, an inner cylindrical part centrally located within said upper cylindrical part and said lower cylindrical part of said vessel for establishing a first fluid path from said upper cylindrical part to said lower cylindrical part within said inner cylindrical part and a second fluid path from said lower cylindrical part to said upper cylindrical part outside said inner cylindrical part, a number of partitioning walls extending radially within said lower cylindrical part between said lower cylindrical part and said inner cylindrical part and defining in said lower cylindrical part an inlet chamber, an outlet chamber and a number of intermediate chambers located between said inlet chamber and said outlet chamber in a circumferential direction, said inlet chamber comprising an inlet, said outlet chamber comprising an outlet, said inlet chamber and said intermediate chambers each defining a steam permeable bottom, said outlet chamber defining a non-steam permeable bottom, said steam permeable bottom of said inlet chamber being adapted to receive superheated steam from said impeller, said steam permeable bottom is arranged for directing the flow of superheated steam in a number of directions towards said lower cylindrical inner wall, and in directions different from a radial direction of the steam permeable bottom, a heat exchanger located within said inner cylindrical part, and an impeller, wherein said steam permeable bottom comprises a plurality of perforations for guiding said superheated steam in a substantial vertical blowing direction and wherein an opening area of said louvers of said inlet chamber defines an area being 10% to 90% of a total opening area of all of said perforations and louvers of said steam permeable bottom of said inlet chamber, said method comprising the steps of:

(a) maintaining within said vessel a superheated steam at a pressure equal to or larger than the ambient pressure surrounding the vessel, (b) receiving moist bulk particulate material at said inlet, (c) heating said steam within said heat exchanger, (d) generating a flow of superheated steam along said first fluid path from said upper cylindrical part through said heat exchanger within said inner cylindrical part to said lower cylindrical part, and via said steam permeable bottom, directing the flow of superheated steam in a number of directions different from said radial direction, towards said lower cylindrical inner wall, and generally along said second fluid path from said lower cylindrical part to said upper cylindrical part outside said inner cylindrical part, by using said impeller, hereby increasing the velocity and whirling movement of the superheated steam, and (e) ejecting dry bulk particulate material at said outlet.

6. The method according to claim 5, wherein via said steam permeable bottom, said flow of superheated steam is directed in a first direction towards said lower cylindrical inner wall and defining a first angle in relation to said radial direction and a second direction towards said lower cylindrical inner wall and defining a second angle in relation to said radial direction, said first angle being different from said second angle.

7. The method according to claim 5 for drying bulk particulate materials comprising using the apparatus of claim 1.

* * * * *